(12) United States Patent
Hutchings et al.

(10) Patent No.: US 9,772,479 B2
(45) Date of Patent: Sep. 26, 2017

(54) OPTICAL DEVICE

(75) Inventors: Joanne Hutchings, Gloucester (GB); John Charles Clifford Day, Bristol (GB); Nicholas Stone, Budleigh Salterton (GB)

(73) Assignees: The University of Bristol, Bristol (GB); GLOUCESTERSHIRE HOSPITALS NHS FOUNDATION TRUST, Cheltenham (GB)

( * ) Notice: Subject to any disclaimer, the term of this patent is extended or adjusted under 35 U.S.C. 154(b) by 28 days.

(21) Appl. No.: 14/235,621

(22) PCT Filed: Jul. 27, 2012

(86) PCT No.: PCT/GB2012/000624
§ 371 (c)(1),
(2), (4) Date: Jan. 28, 2014

(87) PCT Pub. No.: WO2013/017818
PCT Pub. Date: Feb. 7, 2013

(65) Prior Publication Data
US 2014/0153087 A1 Jun. 5, 2014

(30) Foreign Application Priority Data
Jul. 29, 2011 (GB) .................................. 1113066.3

(51) Int. Cl.
*G02B 21/00* (2006.01)
*B33Y 10/00* (2015.01)
(Continued)

(52) U.S. Cl.
CPC .......... *G02B 21/0004* (2013.01); *B33Y 10/00* (2014.12); *G01J 3/0208* (2013.01);
(Continued)

(58) Field of Classification Search
CPC . G02B 21/0004; G02B 21/00–21/0092; G02B 6/3825; G02B 6/3885;
(Continued)

(56) References Cited

U.S. PATENT DOCUMENTS 4,204,310 A     5/1980   Auracher et al.
4,504,936 A *   3/1985   Faber .................. G06K 17/0012
                                                                                                                   360/98.05
(Continued)

FOREIGN PATENT DOCUMENTS

DE        3316727 A1    11/1984
EP      0 543 578 A1     5/1993
(Continued)

OTHER PUBLICATIONS

Kendall et al., "Evaluation of Raman probe for eosophageal cancer diagnostics," Royal Society of Chemistry (2010).
(Continued)

*Primary Examiner* — Scott J Sugarman
*Assistant Examiner* — Kristina Deherrera
(74) *Attorney, Agent, or Firm* — Marshall, Gerstein & Borun LLP

(57) ABSTRACT

An optical device includes a first sub-assembly having an input lens for collimating illuminating light and having an optical axis. The first sub-assembly also has an output lens for focusing collimated light received from a sample, the output lens having an optical axis which is offset and substantially parallel with the optical axis of the input lens, and further includes a first support piece which houses and supports the input lens and the output lens. The optical device also includes a second sub-assembly having an input filter for filtering the collimated illuminating light, an output filter for filtering the collimated light received from the sample, and a second support piece which houses and
(Continued)

supports the input filter and the output filter. The first and second support pieces are joined together by a liquid-tight joint.

9 Claims, 19 Drawing Sheets

(51) Int. Cl.

| | |
|---|---|
| *G02B 7/00* | (2006.01) |
| *G01J 3/02* | (2006.01) |
| *G01J 3/44* | (2006.01) |
| *B33Y 80/00* | (2015.01) |
| *G02B 23/24* | (2006.01) |
| *G02B 21/16* | (2006.01) |
| *B29C 67/00* | (2017.01) |
| *G02B 6/32* | (2006.01) |
| *G02B 6/36* | (2006.01) |
| *B22F 3/105* | (2006.01) |

(52) U.S. Cl.
CPC .............. *G01J 3/0256* (2013.01); *G01J 3/44* (2013.01); *G02B 7/003* (2013.01); *G02B 23/2476* (2013.01); *B22F 3/1055* (2013.01); *B29C 67/0051* (2013.01); *B33Y 80/00* (2014.12); *G02B 6/32* (2013.01); *G02B 6/3624* (2013.01); *G02B 6/3636* (2013.01); *G02B 6/3652* (2013.01); *G02B 7/006* (2013.01); *G02B 21/16* (2013.01); *G02B 23/2461* (2013.01); *Y10T 29/49826* (2015.01)

(58) Field of Classification Search
CPC .. G02B 6/3897; G02B 6/3893; G02B 6/4292; G02B 6/3869; G02B 6/3849; G02B 6/32; G02B 6/3878; G02B 6/3652; G02B 7/02; G02B 7/023; G02B 7/021; G02B 7/026; G02B 7/003; G02B 7/006; G02B 23/2476; G02B 26/2461; G02B 23/26; G02B 21/06; G02B 21/16; A61B 1/00096; A61B 1/041; A61B 1/01; A61B 1/07; A61B 1/00142; A61B 1/00165; A61B 1/00101; G01J 3/0208; G01J 3/0256; G01J 3/44; Y10T 29/49826
USPC ........ 359/362–398, 811, 819, 822, 827, 828, 359/829, 830; 356/301; 385/53–74; 600/101, 121–125, 129, 130, 136–138, 600/153, 160, 170, 171, 175, 176, 181, 600/182; 362/301
See application file for complete search history.

(56) References Cited

U.S. PATENT DOCUMENTS

| | | | |
|---|---|---|---|
| 5,112,127 A * | 5/1992 | Carrabba | G01J 3/44 250/227.23 |
| 5,432,704 A | 7/1995 | Vouzelaud et al. | |
| 5,680,492 A | 10/1997 | Hopler et al. | |
| 5,845,026 A | 12/1998 | Lee et al. | |
| 6,627,835 B1 | 9/2003 | Chung et al. | |
| 6,728,441 B2 * | 4/2004 | Hwang | G02B 6/32 385/136 |
| 6,982,431 B2 * | 1/2006 | Modlin | G01N 21/253 250/225 |
| 7,369,308 B2 * | 5/2008 | Tsuruta | G01N 21/6458 250/458.1 |
| 7,403,281 B2 * | 7/2008 | Carron | G01J 3/02 356/301 |
| 2001/0036352 A1 | 11/2001 | Kadar-Kallen et al. | |
| 2002/0041818 A1 | 4/2002 | Abe et al. | |
| 2003/0133822 A1 | 7/2003 | Harryson | |
| 2003/0185519 A1 | 10/2003 | Ushinsky | |
| 2008/0050127 A1 | 2/2008 | Sommer et al. | |
| 2010/0214562 A1 | 8/2010 | Mahadevan-Jansen et al. | |
| 2011/0032611 A1 * | 2/2011 | Mick | H01J 37/20 359/395 |
| 2012/0205302 A1 * | 8/2012 | Palmer | E04H 4/12 210/167.11 |

FOREIGN PATENT DOCUMENTS

| | | |
|---|---|---|
| GB | 2298288 A | 8/1996 |
| JP | 55101904 A | 4/1980 |
| JP | 56066811 A | 5/1981 |
| JP | 9098943 A | 4/1997 |
| JP | 2005312563 A | 11/2005 |
| WO | WO-99/47958 A1 | 9/1999 |
| WO | WO-01/53865 A1 | 7/2001 |

OTHER PUBLICATIONS

Utzinger, et al., "Fiber optic probes for biomedical optical spectroscopy," Journal of Biomedical Optics 8(1), 121-147 (Jan. 2003).
European Search Report for Application No. GB1113066.3 dated May 17, 2012.
International Search Report and Written Opinion for PCT/GB2012/000624 mailed Jan. 4, 2013.
Day, et al., "A miniature confocal Raman probe for endoscopic use," Physics in Medicine and Biology, Institute of Physics Publishing, Bristol GB, vol. 54 No. 23 (Dec. 7, 2009) pp. 7077-7087.
Kester, et al., "Low cost, high performance, self-aligning miniature optical systems," Applied Optics, Optical Society of America, vol. 48 No. 18 (Jun. 20, 2009).
European Search Report for Application No. GB1113066.3 dated Nov. 14, 2011.

* cited by examiner (5:1)

J-J  96

(5:1)

OPTICAL DEVICE

FIELD OF THE INVENTION

The present invention relates to an optical device, and a method of manufacturing an optical device.

BACKGROUND OF THE INVENTION

Aligning and housing miniature optic components is extremely difficult due to the high tolerances required for precision alignment.

One method is described in Day, J. C. C., Bennett, R., Smith, B, Kendall, C., Hutchings, J., Meaden, G. M., et al. (2009), A miniature confocal Raman probe for endoscopic use, *Physics in medicine and biology,* 54(23), 7077-87. doi: 10.1088/0031-9155/54/23/003.

In Day et al. the optical components are assembled on V-groove mounts on silicon motherboards before insertion into a protective sleeve. A problem with this arrangement is that the silicon motherboards are fragile and easy to break during assembly. Also, the optical components are unprotected during assembly until they are inserted into the protective sleeve.

Another method is described in Robert T. Kester, Todd Christenson, Rebecca Richards Kortum, and Tomasz S. Tkaczyk, "Low cost, high performance, self-aligning miniature optical systems," Appl. Opt. 48, 3375-3384 (2009). Optical components are assembled inside a hypodermic tube and aligned with respect to the tube by self-aligning components. A problem with this arrangement is that it relies on the hypodermic tube providing a straight mechanical axis for aligning the optical components. In reality this tube may have some "waviness" to it so the optical components may not be precisely aligned with each other.

SUMMARY OF THE INVENTION

A first aspect of the invention provides an optical device comprising a first sub-assembly and a second sub-assembly, wherein the first sub-assembly comprises: an input lens for collimating illuminating light, the input lens having an optical axis, an output lens for focusing collimated light received from a sample, the output lens having an optical axis which is offset and substantially parallel with the optical axis of the input lens, and a first support piece which houses and supports the input lens and the output lens; wherein the second sub-assembly comprises: an output filter for filtering the collimated light received from the sample, and a second support piece which houses and supports the output filter; and wherein the first and second support pieces are joined together by a joint which is preferably liquid-tight.

The optical components in the first sub-assembly will typically remain the same for most applications. However different output filters may be required depending on the wavelength of the illumination light (or other parameters). Forming the device as a two-part assembly simplifies manufacturing in that it enables a large number of first sub-assemblies to be constructed, and a set of interchangeable second sub-assemblies (with different filters) to be constructed independently. A specific second sub-assembly can then be fitted depending on the application.

The first and second pieces may be joined at the joint with glue. Alternatively, if glue is not used to form the joint then the second sub-assembly can be removed during use and replaced with another sub-assembly with a different output filter.

A further aspect of the invention provides a method of manufacturing an optical device, the method comprising: growing a support piece by a process of additive fabrication in which the support piece is built up as a series of layers, each layer adhering to a previous layer, and each layer being formed in its final shape in accordance with a computer model before addition of the next layer; and supporting two or more optical components with the support piece, each optical component engaging the support piece and being aligned by the support piece relative to the other component(s).

Engaging each optical component with a respective part of a single integrally formed support piece (instead of engaging them with separate self-aligning components as in Kester et al) enables them to be aligned accurately with respect to each other. Forming the support piece by additive fabrication enables the support piece to be formed with high accuracy, and enables complex shapes to be grown which may not be possible by other techniques such as extrusion. The optical components may be mounted in or on the support piece after the support piece has been grown, or the support piece may be grown around the optical components.

Typically each optical component is aligned by a groove (such as a V-groove) or a channel (such as a circular or square channel) in the support piece.

Examples of suitable additive fabrication processes include liquid-based processes such as stereolithography or ink jet printing; or powder-based processes such as selective laser sintering in which a selected portion of powdered material is melted or sintered to form each layer in its final (net) shape; or the method described in US2003/0133822 in which selected portions of a powder layer are treated with an additive before a unification process.

A further aspect of the invention provides an optical device comprising: a support piece; and a plurality of optical components supported by the support piece, each component engaging the support piece and being aligned by the support piece relative to the other components. The support piece has been formed by a process of additive fabrication in which the support piece is built up as a series of layers, each layer adhering to a previous layer and each layer being formed in its final shape in accordance with a computer model before addition of the next layer.

The optical components engaging the support piece may comprise for example lenses; filters; optical fibres which engage the support piece directly; or optical fibre assemblies each comprising an optical fibre housed in a ferrule, the ferrule engaging the support piece.

Typically at least some surfaces of the support piece have a voxellated shape as a result of the additive fabrication process. For instance at least some surfaces of the support piece may have a voxellated shape comprising a series of steps, at least some of the steps having a height or width less than 50 µm.

Preferably the first and/or second support piece comprises: a base which engages the optical components; and a cover, wherein the cover and the base together fully enclose each optical component when viewed in cross-section transverse to its optical axis. The cover and base are integrally formed in a single piece, which may be formed, for instance, by additive fabrication or moulding.

A further aspect of the invention provides an optical device comprising: a support piece; and a plurality of optical components supported by the support piece, each component engaging the support piece and being aligned by the support piece relative to the other components, wherein each optical component is aligned by a groove or channel in the support piece, the (or each) groove or channel has a pair of side walls which each engage a respective side of an optical component, and the support piece further comprises an end stop which engages an end of the optical component. The base and end stop are integrally formed in a single piece, which may be formed, for instance, by additive fabrication or moulding.

The device may comprise a probe for illuminating and/or receiving light from a sample. For instance the device may be a Raman or luminescence spectroscopic probe, or a reflectance or fluorescence microscope.

Preferably the device further comprising a spectrometer for generating a spectrum (such as a Raman spectrum or luminescence spectrum) from the light received from the sample. The light received from the sample may be inelastically scattered light.

Preferably the (or each) support piece has a maximum outer diameter which is less than 25 mm, preferably less than 15 mm, more preferably less than 5 mm and most preferably less than 3 mm. This makes the device suitable for use in an endoscope or other medical device.

The support piece typically comprises a pair of grooves or channels, each groove or channel carrying a lens with an optical axis and an optical fibre having an optical axis which is collinear with its respective lens to an accuracy of 5 milliradian or less. The optical fibre may be supported directly by the support piece without a ferrule, or it may be housed within a ferrule which engages the support piece. Typically the grooves or channels are parallel to an accuracy of 5 milliradian or less.

A further aspect of the invention provides a medical device, such as an endoscope, comprising a head portion, and a shaft portion with an instrument channel which at its distal end contains an optical device according to any preceding aspect of the invention.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
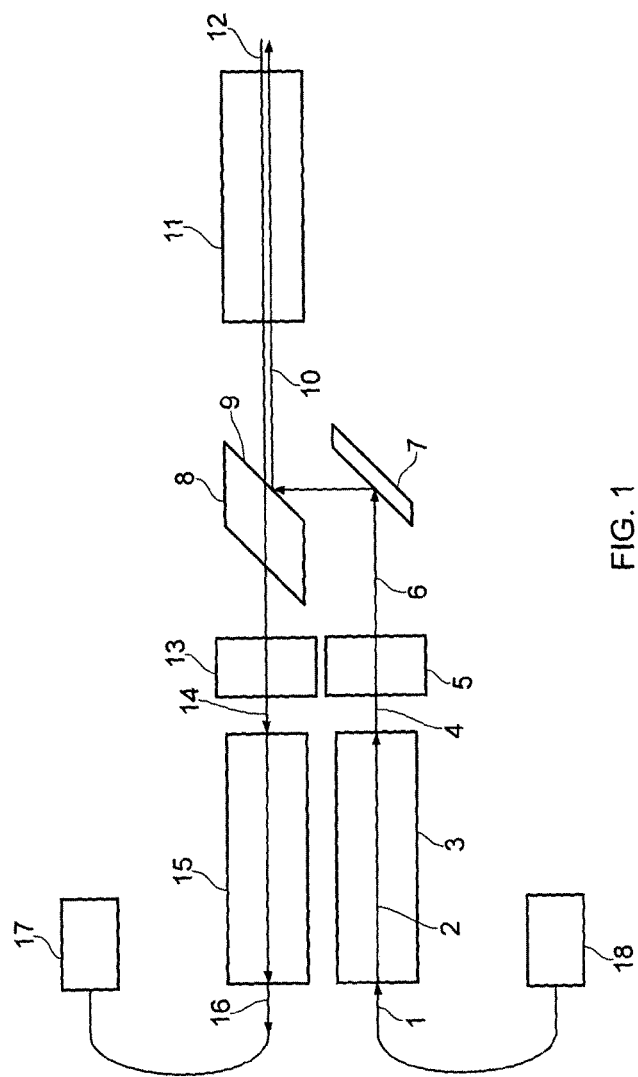
FIG. 1 is a schematic diagram of the optical layout of a spectroscopic probe.

FIG. 1 is a schematic diagram of the optical layout of a spectroscopic probe. An excitation fibre 1 receives light from a laser 18 with a wavelength of 830 nm. The fibre 1 directs the laser beam 2 into a gradient index (GRIN) input lens 3. The lens 3 collimates the laser beam 2 to generate a collimated beam 4. The collimated beam 4 is then passed through a short (wavelength) pass filter 5 that rejects Raman and photoluminescence emission generated within the fibre 1. The filtered and collimated beam 6 is then reflected by a mirror 7 to a long (wavelength) pass filter 8 with an angled face 9 which reflects light at the laser wavelength but transmits longer wavelengths. The reflected light 10 is directed to a GRIN objective lens 11 which focuses the light 10 onto a sample (not shown).

Light 12 from the sample is collected and collimated by the lens 11 and directed back to the filter 8. Elastically scattered light is reflected by the angled face 9, returns along the original path 2, 4, 6 and is effectively lost. Stokes shifted wavelengths are transmitted by the filter 8 through a second long (wavelength) pass filter 13 which provides further rejection of elastically scattered light. The filtered beam 14 is then focussed by a GRIN output lens 15 onto an output fibre 16 connected to a spectrometer 17 for generating a Raman spectrum.

The design is essentially confocal in nature: the exit aperture of the excitation fibre 1 being confocal with the entrance aperture of the output fibre 16. In other words the conjugate image of the tip of the fibre 1 at the focal plane of the objective lens 11 is substantially co-incident with the conjugate image of the tip of the fibre 16 at the focal plane of the objective lens 11. This confers the benefits of confocal microscopy, in which out of focus contribution is minimised and the device can be more specific when assigning a Raman signature to a given volume. A further benefit of confocal microscopy is that it allows the potential for depth discrimination through serial measurements at varying focal depth.

Optionally the depth of field may be adjusted by selecting different fibre sizes or varying the ratio of the objective lens 11 to the collimating lenses 3, 15.

Due to the confocal nature of the design, the fibre 1 must be accurately aligned with the lens 3 (to an accuracy of 20 µm or less) so that their optical axes are substantially collinear (to an accuracy of 5 milliradian or less). Similarly the fibre 16 and lens 15 must be accurately aligned so that their optical axes are substantially collinear. Similarly the optical axes of the GRIN lens 3 and GRIN lens 15 must be substantially parallel (to an accuracy of 5 milliradian or less). The alignment of the optical components 5, 7, 11, 8, 13 is important but less critical than the alignment of the fibres 1, 16 and lenses 3, 15.

Figure 2:
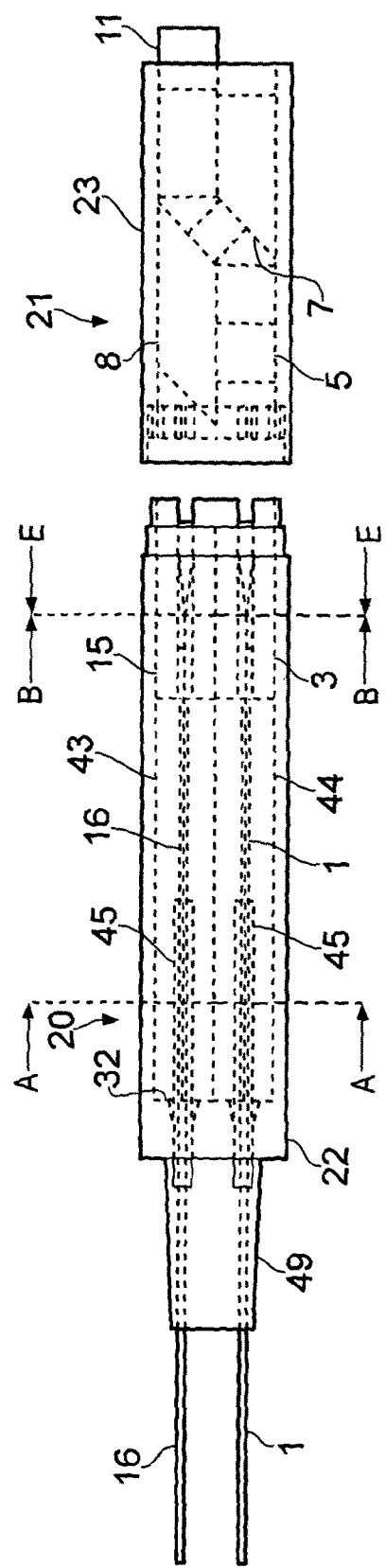
FIG. 2 is a plan view of a spectroscopic probe according to a first embodiment of the invention, in a partially disassembled state.

FIG. 2 is a plan view of a spectroscopic probe constructed according to the optical layout of FIG. 1. Note that the probe is shown in a partially disassembled state with a first (proximal) sub-assembly 20 disassembled from a second (distal sub-assembly) 21. The proximal sub-assembly 20 comprises the optical fibres 1, 16, the collimating lenses 3, 15 and a support piece 22 which houses and supports these optical components 1, 16, 3, 15. The distal sub-assembly 21 comprises the optical components 5, 7, 8, and 11 and a support piece 23 which houses and supports these optical components. Note that the second long (wavelength) pass filter 13 is omitted from the probe of FIG. 2.

Figure 3:
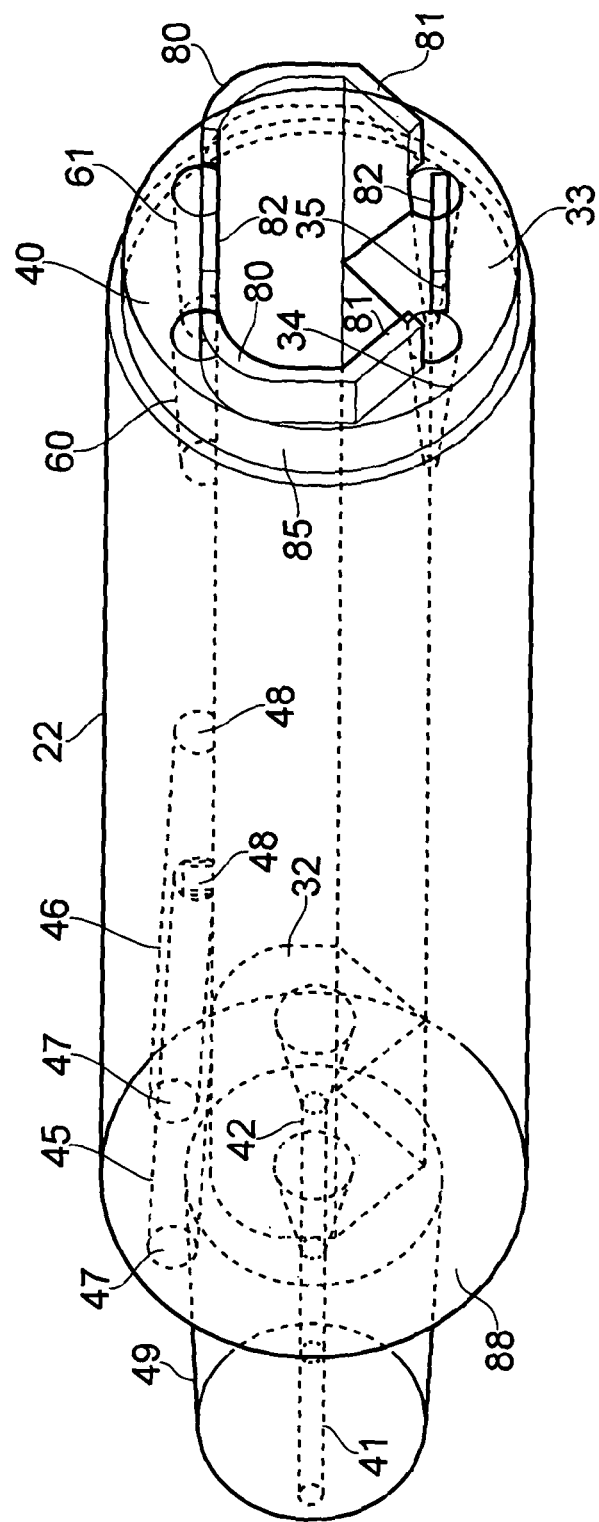
FIG. 3 is a perspective view of the proximal support piece.
Figure 4:
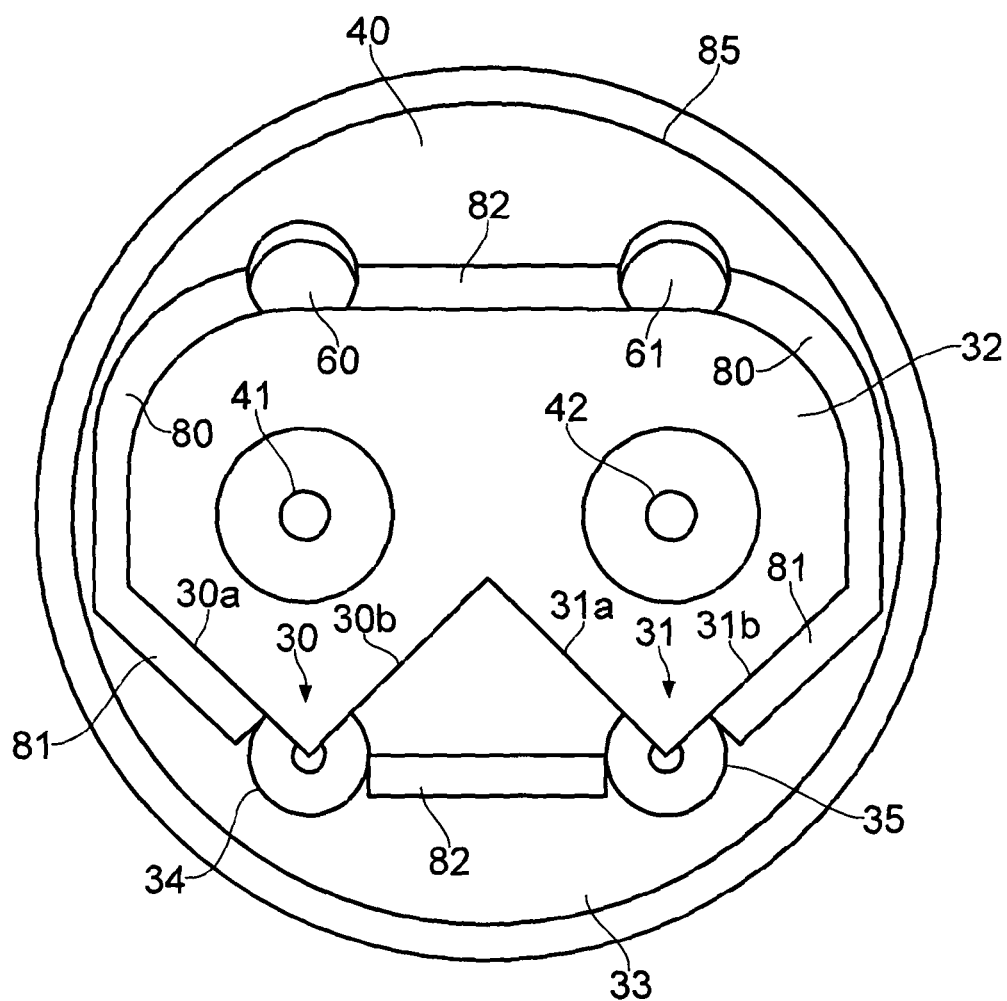
FIG. 4 is an end view of the proximal support piece.

FIGS. 3 and 4 show the support piece 22 with the optical components omitted. The support piece comprises a base 33 with a pair of V-grooves 30, 31. Each V-groove has a pair of faces 30a,b and 31a,b which meet at an angle of 90° to form a tapered V shape, each face engaging a respective side of two of the optical components housed within the support piece 22. The long axes of the V-grooves run substantially parallel with the long axis of the support piece 22.

The V-grooves are closed at their proximal end by an end wall 32 shown in FIG. 4 and are open at their distal end. The base 33 is formed with a pair of glue injection ports 34, 35 which open into the base of the V-grooves 30, 31. As shown most clearly in FIG. 3, the ports 34, 35 run upwardly at an acute angle to the long axis of the support piece.

Figure 5A:
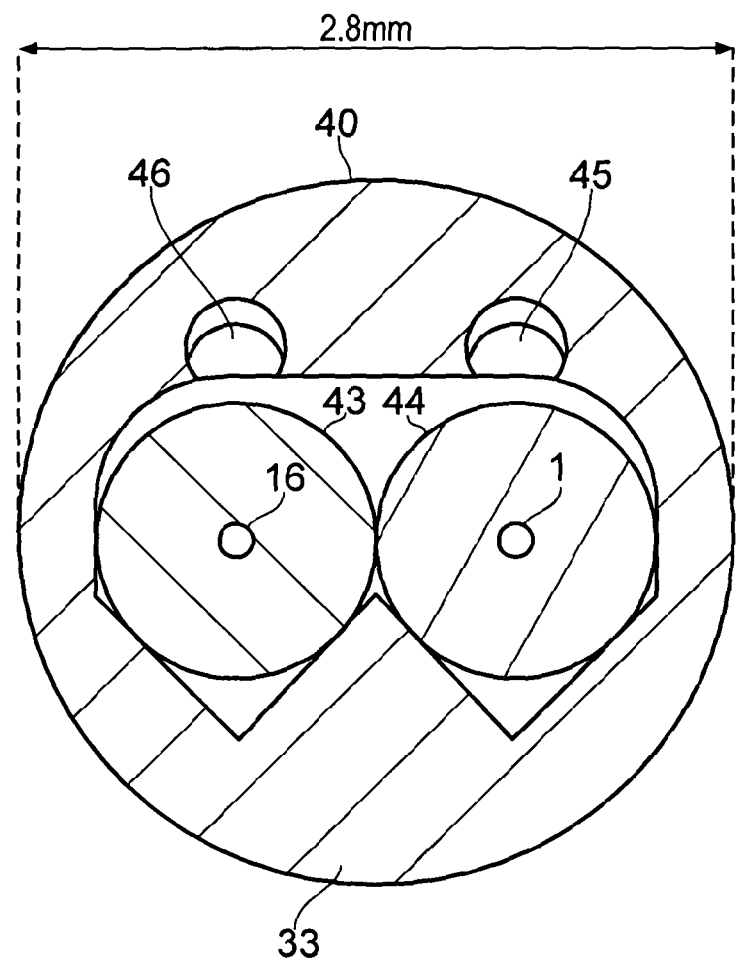
FIG. 5a is a section taken along a line A-A in FIG. 2 with the pins omitted.
Figure 6A:
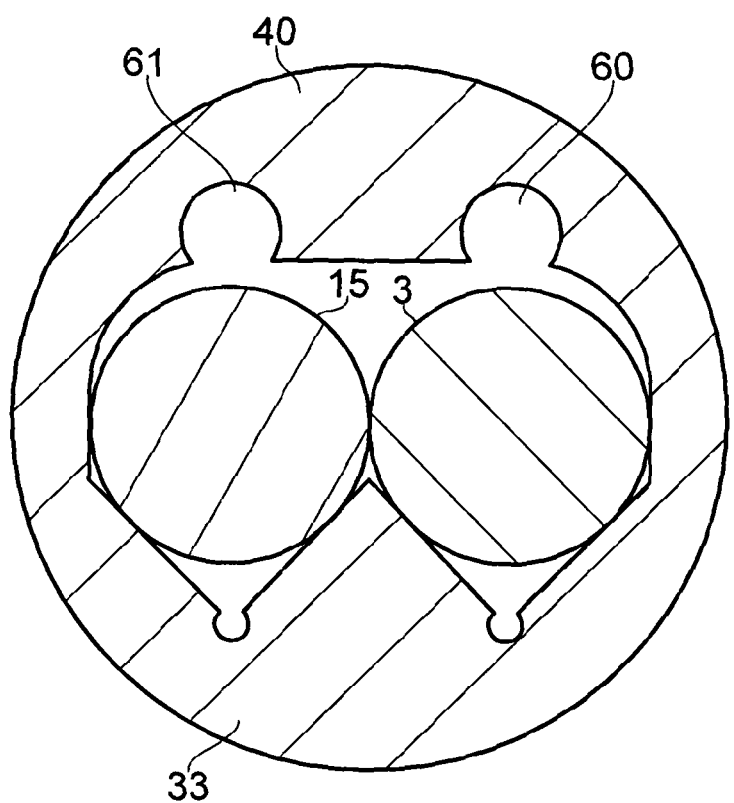
FIG. 6a is a section taken along a line B-B in FIG. 2 with the pins omitted.

The support piece 22 has a cover 40 which is formed integrally with the base 33. The cover and the base 33 together form a closed tubular structure which fully encloses the optical components 1, 16, 3, 15 when viewed in cross-section transverse to their optical axes as shown in FIGS. 5a and 6a. This closed tubular structure gives the support piece 22 more rigidity than the silicon motherboard in Day et al, and also means that no additional outer protective sleeve is required, thus minimising the overall diameter of the probe. The support piece 22 has a circular outer profile with a diameter of about 2.8 mm.

Referring to FIG. 3, the support piece 22 has a boss 49 at its proximal end with a pair of parallel cylindrical channels 41, 42 which are flared at their distal ends where they open into the end wall 32. The distal ends of the optical fibres 1, 16 are housed within cylindrical ferrules 43, 44 with the same diameter (1 mm) as the collimating lenses 3, 15. The optical fibres 1, 16 are threaded axially through the channels 41, 42, from right to left in the viewing direction of FIG. 2, until the ferrules 43, 44 engage the end wall 32. The collimating lenses 3, 15 are then slid into the V-grooves until their distal end faces butt up against the proximal ends of the ferrules as shown in FIG. 2.

Optionally the optical fibres have their ends flush with the ends of the ferrules and the lenses 3,15 are designed for zero working distance so their focal point is on the end surface. Alternatively lenses with a non-zero focal length may be used with the fibres terminating at some point within the body of the ferrule.

Referring to FIG. 3, the distal end of the cover 40 is formed with a pair of grooves 60, 61 which open into the lower face of the cover 40. The long axes of the grooves 60, 61 run downwardly at an acute angle to the long axis of the support piece.

Figure 6B:
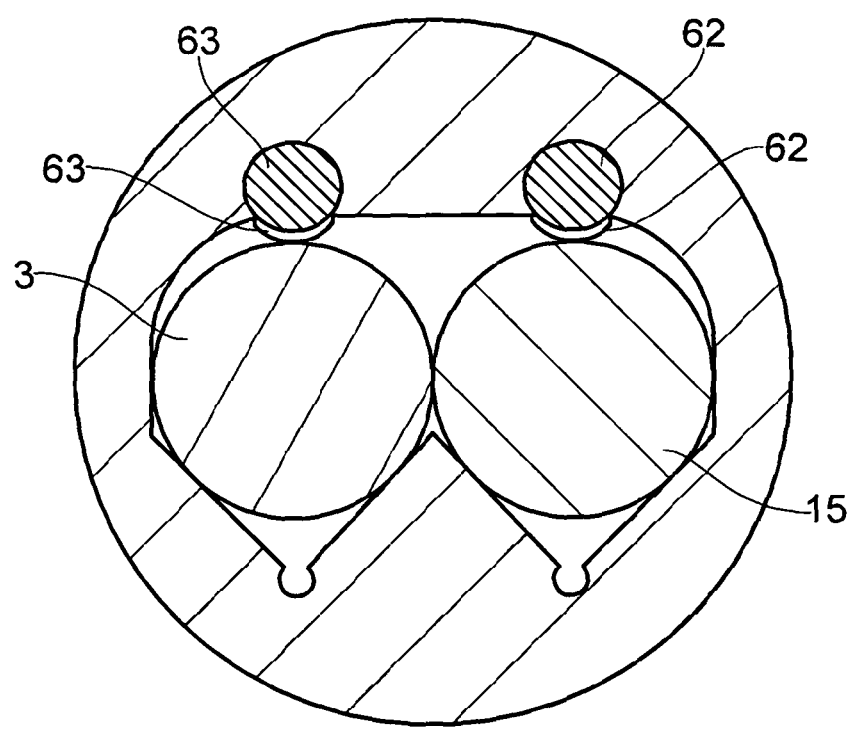
FIG. 6b is a section taken along a line E-E in FIG. 2 with the pins included.
Figure 8:
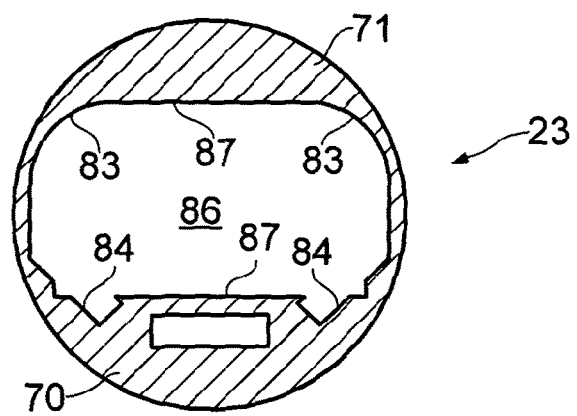
FIG. 8 is a section taken along a line F-F in FIG. 7.

After the lenses 3, 15 have been slid into place, pins 62, 63 are pushed into the grooves 60, 61 until they engage the lenses as shown in FIG. 6b. As the pins 62, 63 are pushed further they impart an axial force which presses the planar end faces of the lenses 3, 15 against the planar end faces of the ferrules 43, 44. The pins 62, 63 also impart a radial force which ensures that the lenses 3, 15 firmly engage with the walls of the V-grooves.

Figure 5B:
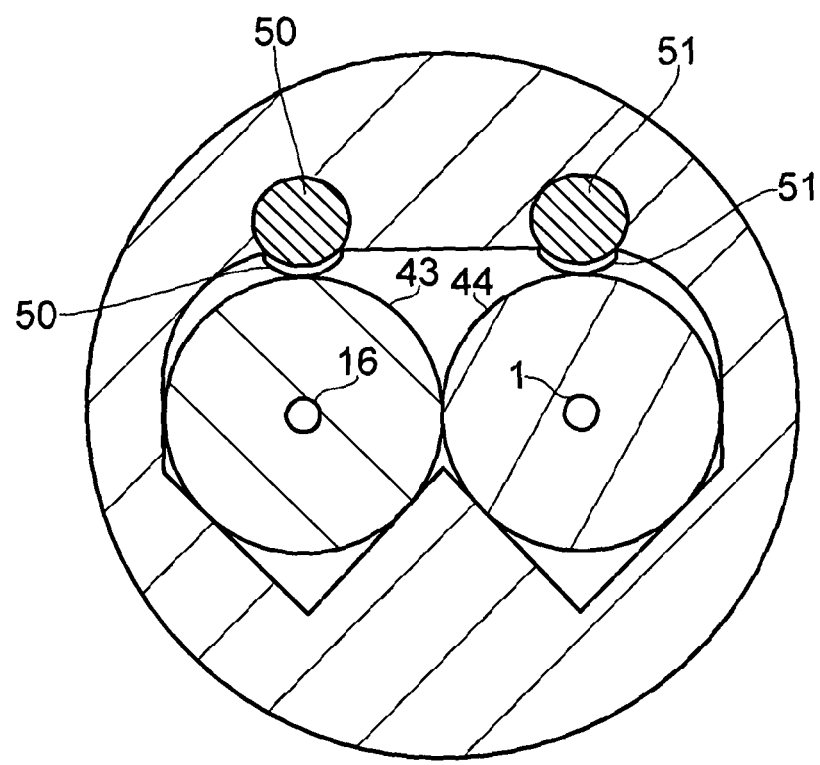
FIG. 5b is a section taken along a line A-A in FIG. 2 with the pins included.

The cover 40 also has a pair of channels 45, 46 at its proximal end. The channels 45, 46 have open ends 47 and open ends 48. As shown most clearly in FIG. 3, the long axes of the channels 45, 46 run downwardly at an acute angle to the long axis of the support piece. After the ferrules 43, 44 have been slid into place and fixed by the pins 62, 63, further pins 50, 51 are pushed into the channels 45, 46 until they engage the ferrules 43, 44 as shown in FIG. 5b. As the pins 50, 51 are pushed further they impart an axial force which presses the planar end faces of the ferrules 43, 44 against the planar end faces of the lenses 3, 15.

The pins 50, 51 also impart a radial force which ensures that the ferrules firmly engage with the walls of the V-grooves.

Glue is then injected into the channels 65, 66 between the V-grooves and the cylindrical optical components 43, 44, 3, 15 via the glue injection ports 34, 35 and cured at room temperature to adhere them in place. The pins 50, 51 and 62-63 can then be removed (or optionally left in place). Alternatively, if the pins 50, 51 and 62, 63 are left in place then glue may not be necessary.

Thus the fibre/ferrule 1/44 and lens 3 are aligned by one of the V-grooves 30 so that their axes are substantially collinear, and the fibre/ferrule 16/43 and lens 15 are aligned by the other V-groove 31 so that their axes are substantially collinear and parallel with the axes of the fibre 1 and lens 3.

Figure 11:
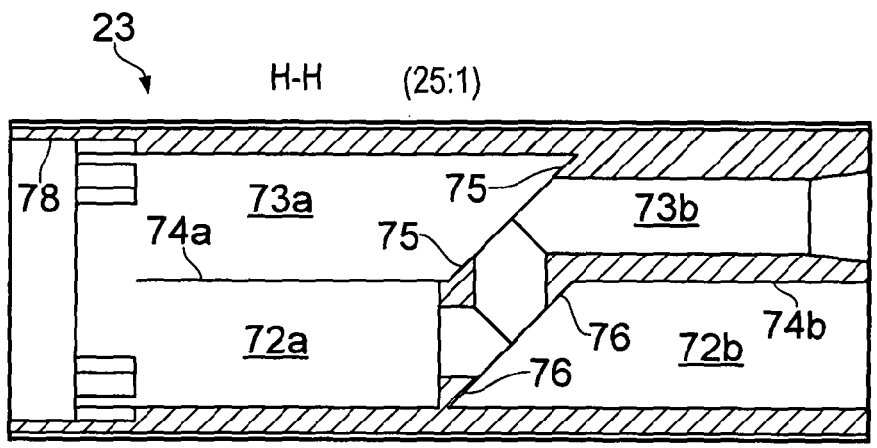
FIG. 11 is a section taken along a line H-H in FIG. 9.
Figure 13:
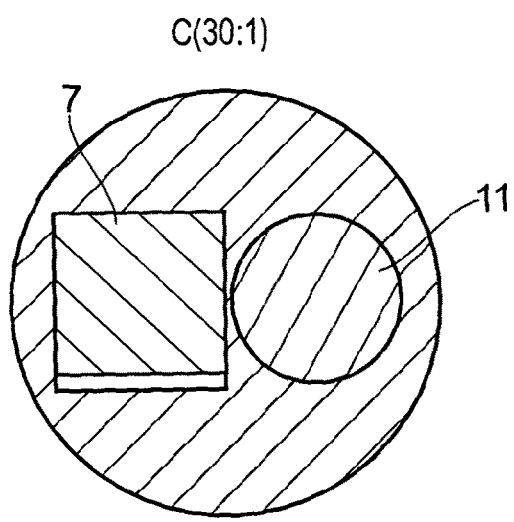
FIG. 13 is a section taken along a line C-C in FIG. 12.
Figure 12:
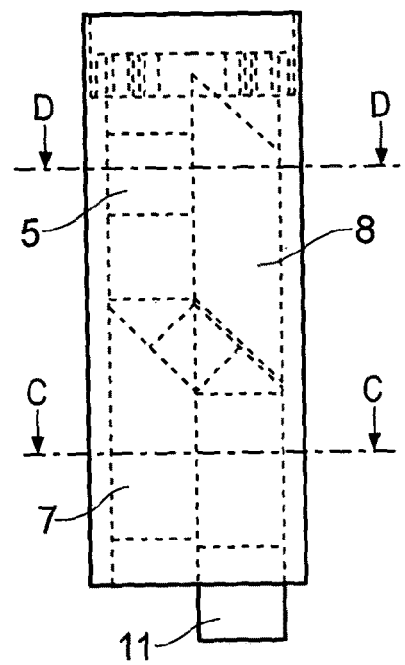
FIG. 12 is a plan view of the distal support piece with the optical components inserted.
Figure 14:
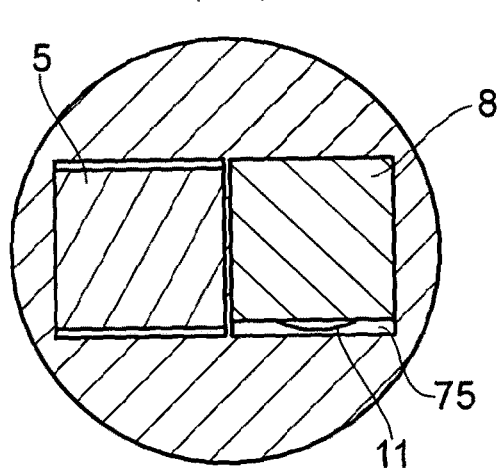
FIG. 14 is a section taken along a line D-D in FIG. 12.

FIGS. 7 to 11 show the support piece 23 of the distal sub-assembly 21 with the optical components omitted and FIGS. 12 to 14 show the support piece 23 of the distal sub-assembly 21 with the optical components in place. The support piece comprises a base 70 and a cover 71 which are formed integrally and together provide a closed tubular structure which fully encloses the optical components when viewed in cross-section transverse to its optical axis as shown in FIGS. 13 and 14. The support piece 23 has a circular outer profile which matches that of the support piece 22, with a diameter of about 2.8 mm.

Figure 7:
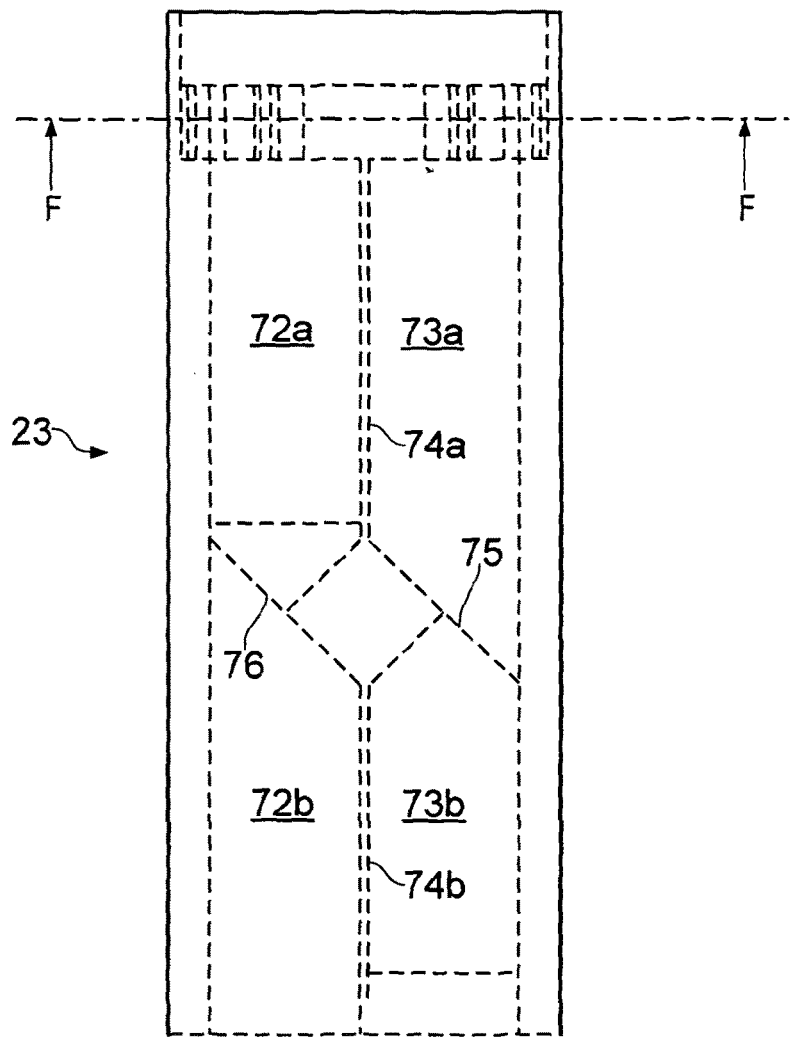
FIG. 7 is a plan view of the distal support piece.
Figure 10:
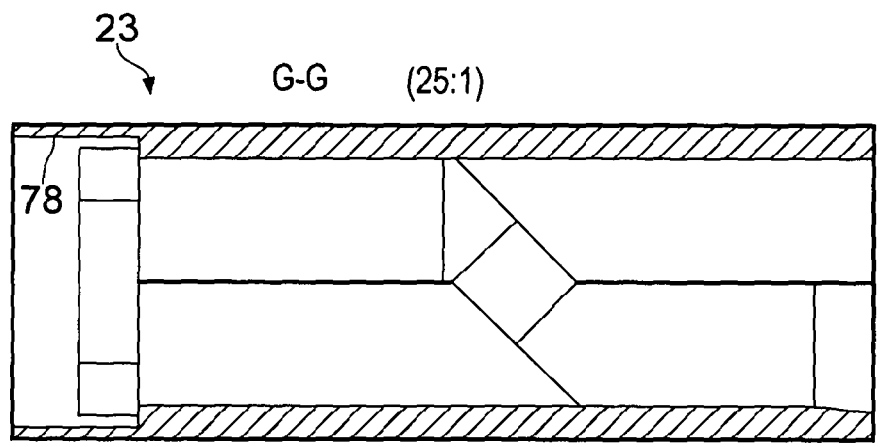
FIG. 10 is a section taken along a line G-G in FIG. 9.
Figure 9:
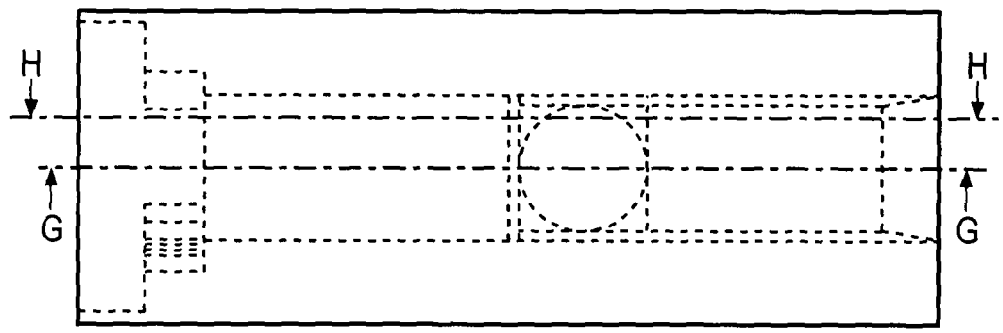
FIG. 9 is a side view of the distal support piece with the optical components omitted.

The proximal end of the support piece is divided into a pair of channels 72a, 73a by a wall 74a shown in FIGS. 7 and 11. The channels 72a, 73a each have a rectangular cross-section. The distal end of the support piece is divided into a pair of channels 72b, 73b by a wall 74b shown in FIGS. 7 and 11. The channel 73b has a circular cross-section and the channel 72b has a square cross-section. The objective lens 11 is mounted at the distal end of the channel 73b as shown in FIGS. 12 and 13 and fixed in place with glue. The filter 8 is slid into the channel 73a until it engages an angled stop 75 and fixed in place with glue between the filter 8 and the end stop 75. The mirror 7 is slid into the channel 72b until it engages an angled stop 76. The mirror 7 is fixed in place by filling the distal end of the channel 72b with glue, or a stopper. The filter 5 is slid into the channel 72a and fixed in place with glue on the sides of the filter 5.

After the sub-assemblies 20, 21 have been assembled as shown in FIG. 2, they are brought together to form a liquid-tight sealed joint. Referring to FIGS. 3 and 4, the support piece 22 has a plug consisting of four male parts which project from its distal end: a pair of parts each having a curved upper portion 80 and a planar lower portion 81; and a pair of planar parts 82 between the grooves 60, 61 and glue injection ports 34, 35. When the support pieces 22, 23 are brought together, the male parts 80-82 plug into a socket 86 in the support piece 23 shown in FIG. 8. The socket 86 has curved walls 83 which key with the curved parts 80, planar walls 87 which key with the planar parts 82, and grooves 84 which key with the planar lower portions 81.

Before bringing the support pieces together, glue is applied to a cylindrical surface 85 of the support piece 22 shown in FIGS. 3 and 4. This glue forms a liquid-tight joint between the surface 85 and a bore wall 78 shown on the left-hand side of FIGS. 10 and 11. Optionally glue is also applied to the end face of the base 33 and the end face of the cover 40, so these end faces are adhered to the end faces of the base 70 and cover 71 of the support piece 23. The male parts 80-82 act as a glue barrier, preventing the glue from flowing onto the end faces of the lenses 3, 15.

Alternatively, instead of using glue to form the liquid-tight joint between the support pieces, an O-ring may be fitted between the cylindrical surface 85 and the bore wall 78 to form a liquid-tight joint between them. This will enable the support pieces 22, 23 to be disassembled more easily if required.

If the pins 62, 63 are removed after the optical components have been glued into the V-grooves, then the channels 60, 61 and glue injection ports 34, 35 are closed by the end faces of the base 70 and cover 71. If the pins 50, 51 are removed after the optical components have been glued into the V-grooves, then the ends 47, 48 of the channels 45, 46 are closed by a sleeve 133 (shown in FIG. 25) which is slid over the boss 49 and abuts the annular exterior end face 88 of the support piece 22. Thus the first and second support pieces 22, 23 together with the sleeve 133 house the optical components within a liquid-tight chamber.

If the pins 50, 51, 62, 63 are left in place then the sleeve 133 and end faces of the base 70 and cover 71 prevent the pins from falling out, and may also force the pins further into engagement with the optical components.

As an alternative, the lenses 3, 5 and ferrules 43, 44 may be received as an interference fit in the support piece 22 so they engage the cover 40 as well as the walls of the V-grooves. In this case the channels 45, 46, 60, 61 and glue ports 34, 35 can be omitted since glue and pins are not required to fix the optical components in place. In this case the cover 40 may be formed from a resilient material (such as an elastomer) which is more flexible than the material forming the base 43 in order to ensure a tight fit.

The optical components in the proximal sub-assembly 20 will remain the same for most applications. However the optical components in the distal sub-assembly 21 may vary depending on application. For instance different filters may be required depending on the wavelength of the illumination light (or other parameters) or different objective lenses may be required to vary the depth of field. Forming the device as a two-part assembly simplifies manufacturing in that it enables a large number of proximal sub-assemblies 20 to be constructed, and a set of interchangeable distal sub-assemblies 21 (with different filters for example) to be constructed independently. A specific sub-assembly 21 can then be fitted depending on the application. Also, if glue is not used to form the fluid-tight joint then the sub-assembly 21 can be removed during use and replaced with another sub-assembly 21 with a different set of optical components.

Figure 15:
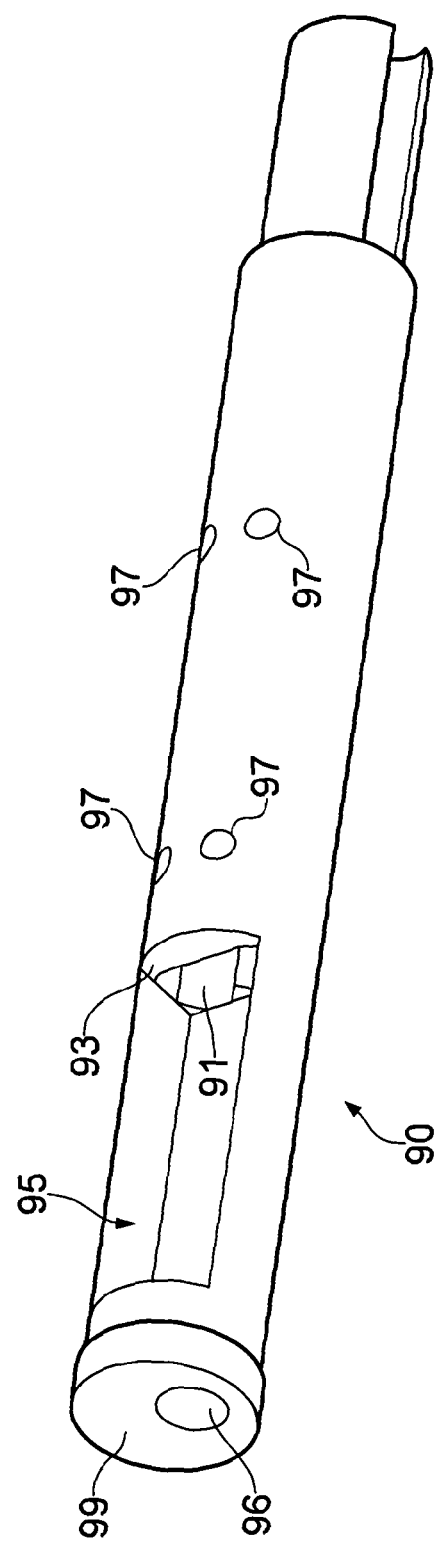
FIG. 15 is a perspective view of an alternative support piece.
Figure 18:
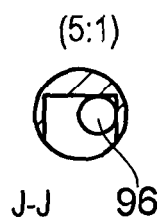
FIG. 18 is a section taken along a line J-J in FIG. 16.
Figure 16:
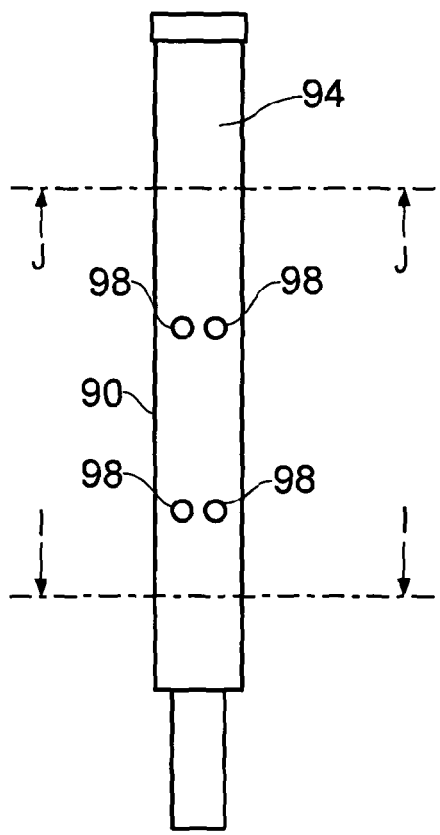
FIG. 16 is a bottom view of the support piece.
Figure 17:
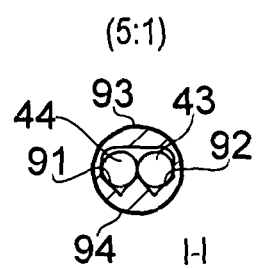
FIG. 17 is a section taken along a line I-I in FIG. 16.

FIGS. 15-18 show a spectroscopic probe constructed according to a second embodiment of the invention. The optical components are housed in a single support piece 90 which is shown in FIG. 15 with the optical components removed. The support piece comprises a base 94 with a pair of V-grooves 91, 92. Each V-groove has a pair of faces which meet at an angle of 90° and run substantially parallel with the long axis of the support piece 90. The support piece also has a cover 93 which together with the base 94 forms a closed tubular structure which fully encloses the optical components 1, 16, 3, 15 when viewed in cross-section transverse to its optical axis as shown in FIG. 17.

The proximal end of the support piece has an open recess 95 with no cover. The objective lens 11 is mounted in a hole 96 in a wall 99 at the distal end of the support piece and glued in place. The mirror 7 and filter 8 are then inserted into the recess 95 and fixed with glue.

The distal ends of the optical fibres 1, 16 are housed within cylindrical ferrules 43, 44 with the same diameter (1 mm) as the collimating lenses 3, 15. The lenses 3, 15 and ferrules are threaded axially through the recess 95 and along the V-grooves 91, 92 from right to left in the viewing direction of FIG. 15 until the lenses reach the ends of the V-grooves. Pins (not shown) are then inserted into holes 97 in the cover 93 to push the optical components down into the V-grooves. The optical components 1, 3, 15, 16 are then fixed in place with glue injected into glue ports 98 in the base 94 and the pins removed. A protective stainless steel sleeve (not shown) is then slid over the support piece 90 to seal the holes 97, glue ports 98 and recess 95.

As an alternative, the lenses 3, 5 and ferrules 43, 44 may be received as an interference fit in the support piece 90 so they engage the cover 93 as well as the walls of the V-grooves. In this case the holes 97 and glue ports 98 can be omitted since glue and pins are not required to fix the optical components in place. In this case the cover 93 may be formed from a more flexible material than the base 94 in order to form a tight fit.

Figure 19:
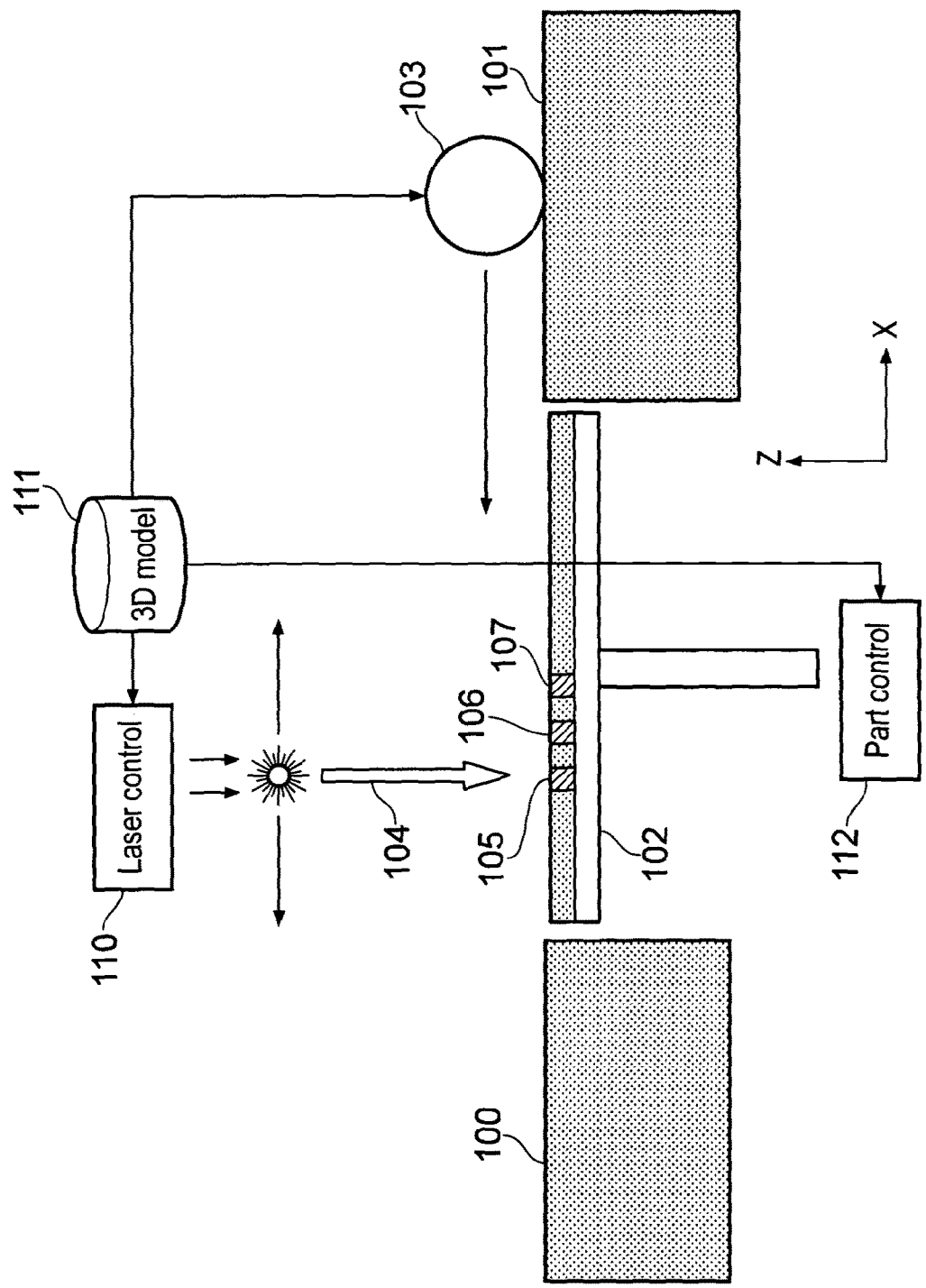
FIG. 19 shows a first method of manufacturing the support pieces by additive fabrication.

A method of manufacturing the support pieces 22, 23, 90 by selective laser sintering is shown in FIG. 19. Two supplies of metal powder 100, 101 are installed on opposite sides of a build platform 102. The metal may comprise for example 316L or 316 LVM stainless steel. A first layer of powder is transferred from the supply 100 onto the platform 102 bed by a roller 103. The powder layer has a depth D along a Z dimension (or build axis). The first layer is then selectively sintered by scanning a laser beam 104 over the layer, and modulating the laser so that certain areas of the powder layer are sintered and other are not. The laser is modulated by a laser control device 110 under control of a computer 111 in accordance with a three dimensional (3D) model of the part to be manufactured which is stored by the computer 111. The 3D model defines the part as an array of voxels which are arranged in a cubic grid having three orthogonal axes XYZ, each voxel having a width W in the X and Y directions, and a depth D in the Z direction. The grid spacing of the 3D model will define the width W and depth D. Both dimensions are typically less than 50 μm and can be less than 20 μm.

FIG. 19 shows three cubic voxels 105-107 which have been sintered, the remaining parts of the layer remaining unconsolidated powder. Once the layer has been selectively sintered, the platform is lowered by a part control device 112 a distance D in the Z direction, the roller 103 rolls to the left to transfer a second layer of powder onto the previous layer, and the sintering process repeated with a different pattern.

Thus each support piece 22, 23 is grown by a process of additive fabrication as a series of layers, each layer adhering to a previous layer, and each layer being formed in its final shape under control of the laser control device 110 in accordance with the 3D model before addition of the next layer. When the support pieces have been grown, the unsintered powder is returned to the supplies 100, 101. Optionally both support pieces 22, 23 may be grown simultaneously on the same build platform 102.

Figure 20:
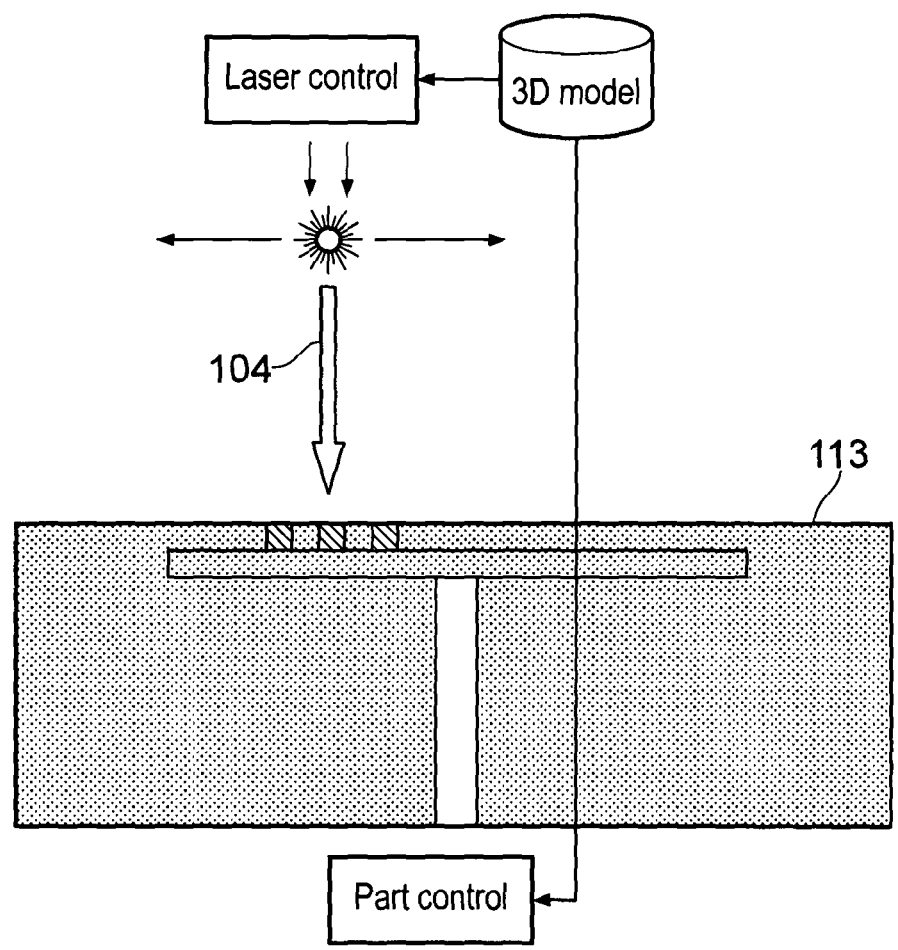
FIG. 20 shows a second method of manufacturing the support pieces by additive fabrication.

A second method of manufacturing the support pieces 22, 23 by additive fabrication is shown in FIG. 20. The build platform is in a bath 113 of curable liquid resin. A first layer is selectively cured by scanning the laser beam 104 over a thin layer of resin on the build platform. The build platform is then retracted into the bath and the next layer selectively cured. Suitable light-cured resins are E-Dent™ or Nanocure™, both available from EnvisionTEC.

In the second method described above the layers are selectively cured by scanning and modulating a laser beam. In an alternative arrangement the layers may be cured by projecting an image from a Xenon lamp onto them, the image changing between the different layers.

In the case where the cover 40, 93 is formed from a more flexible material than the base 33, 94, the cover and base can be integrally formed together as a single piece in an additive fabrication process in which the powder or resin material is changed between the cover and the base. In this case it is preferred for the build axis (Z) to be aligned vertically (relative to the viewing direction of FIG. 3) instead of being aligned parallel with the optical axes of the optical components (left to right relative to the viewing direction of FIG. 3). Alternatively a printer of the kind produced by Objet Inc., of Billerica, Mass., USA may be used to print different materials together.

Figure 22:
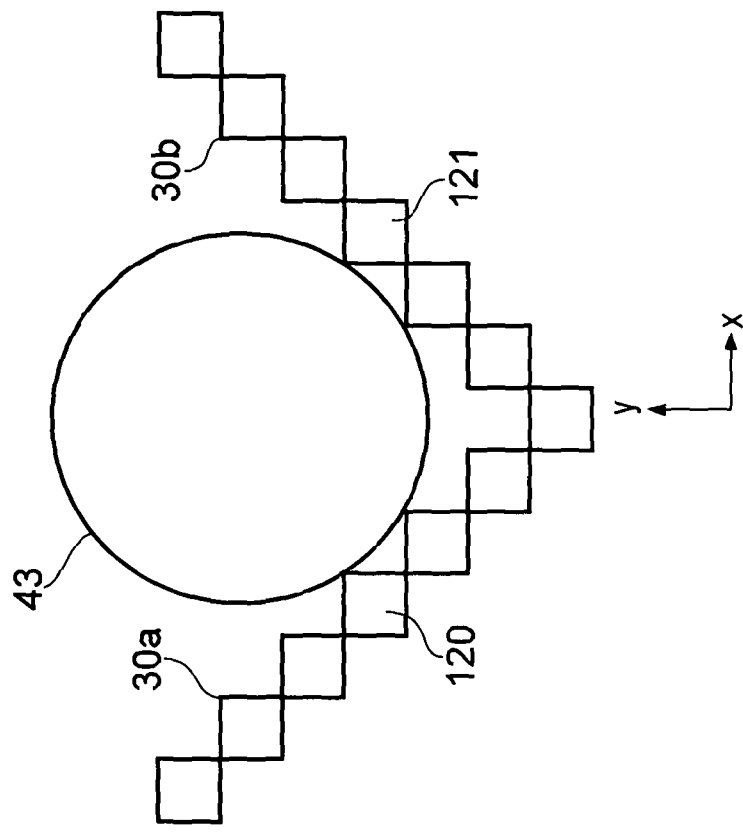
FIGS. 21-23 are schematic diagrams showing the voxellated structure of the walls of one of the V-grooves.
Figure 21:
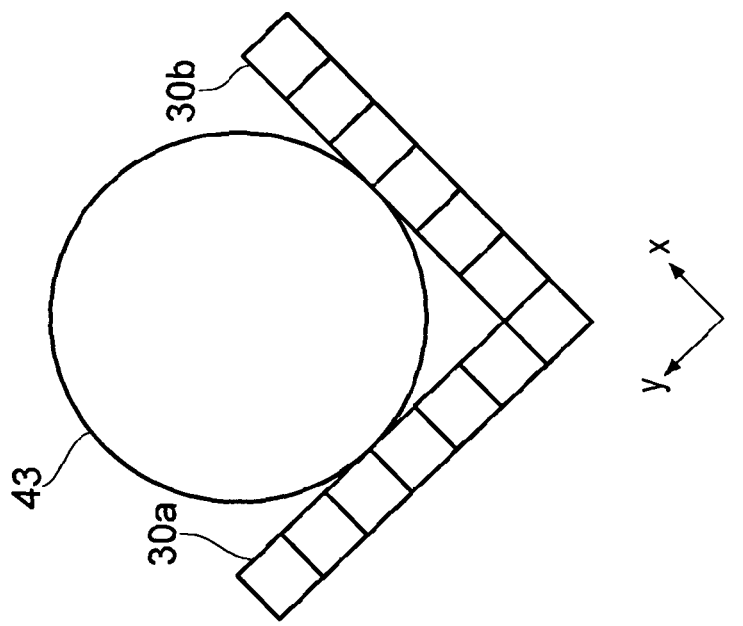
Figure 23:
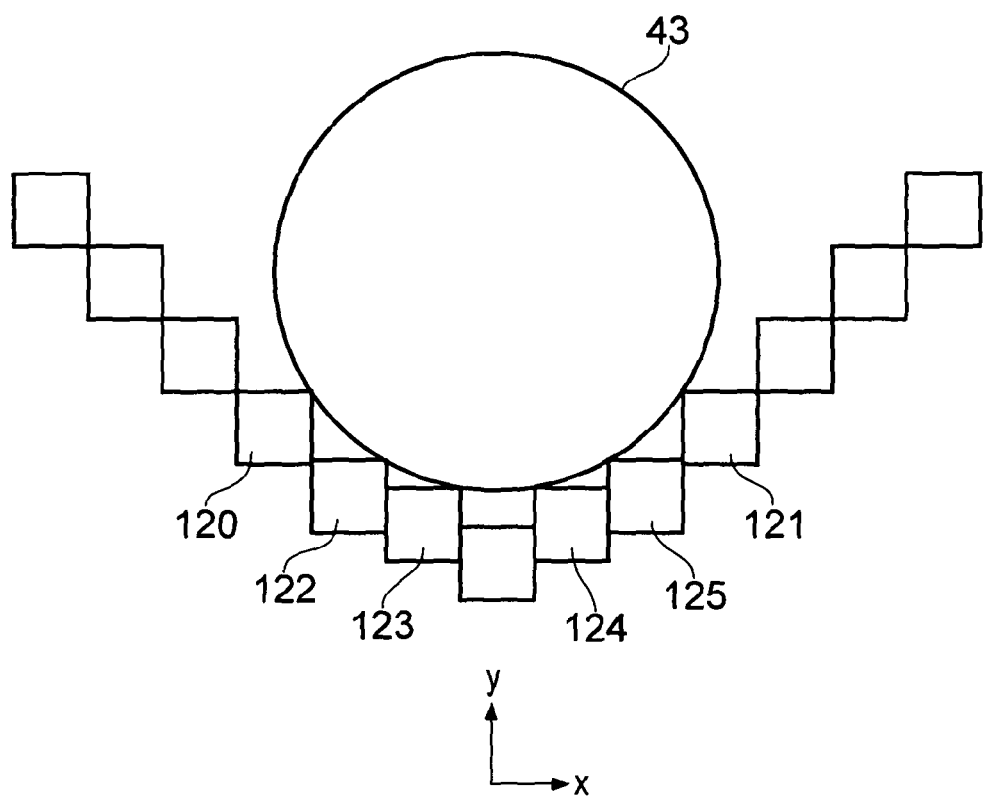

FIGS. 21-23 are schematic diagrams showing the voxellated structure of the walls of one of the V-grooves. FIG. 21 shows a preferred arrangement in which two of the axes XY of the 3D model are parallel with the walls 30a, 30b of the V-groove. FIG. 22 shows a less preferred arrangement in which two of the axes XY of the 3D model are aligned at 45° to the walls 30a, 30b of the V-groove.

In the case of FIG. 21 the walls 30a, 30b are substantially planar with a smooth non-voxellated shape, whereas in the case of FIG. 22 the walls 30a, 30b have a non-planar stepped voxellated structure. In both cases the Z-axis of the 3D model is parallel with the long axis of the V-grooves.

The problem with the arrangement of FIG. 22 is that the walls 30a, 30b will deform in an unpredictable way so that instead of only engaging the corners of two voxels 120, 121 as shown in FIG. 21, the ferrule 43 will engage the corners of multiple voxels 120-125 as shown in FIG. 23. This will make the alignment of the ferrule less accurate than in the case of FIG. 21 where the deformation of the planar walls will be less severe and more predictable.

Figure 24:
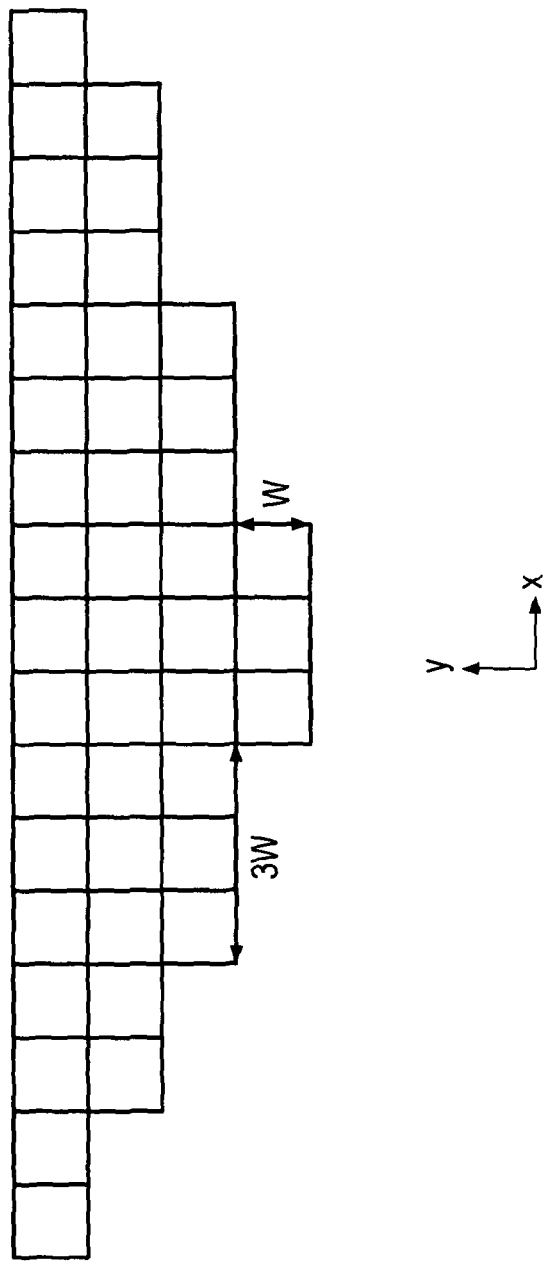
FIG. 24 is a schematic diagram showing the voxellated structure of the curved exterior wall of one of the support pieces.

FIG. 24 is a schematic view showing part of the curved outer surface of the support piece 22. The surface has a voxellated shape comprising a series of steps with a step height which will vary, but has a minimum size determined by the Y-axis grid spacing of the computer model. By way of example the steps shown in FIG. 24 have a height W which is equal to the Y-axis grid spacing. The width of the steps will also vary and in this case the minimum width of the steps will be determined by the X-axis grid spacing of the computer model. By way of example the steps shown in FIG. 24 have a width of 3W.

Note that the size of the voxels is highly exaggerated in FIGS. 21-24 for purposes of illustration, and the voxellated profile will only be visible under high magnification. Also the edges of the voxels will not have sharp corners as shown, but will be rounded.

Figure 25:
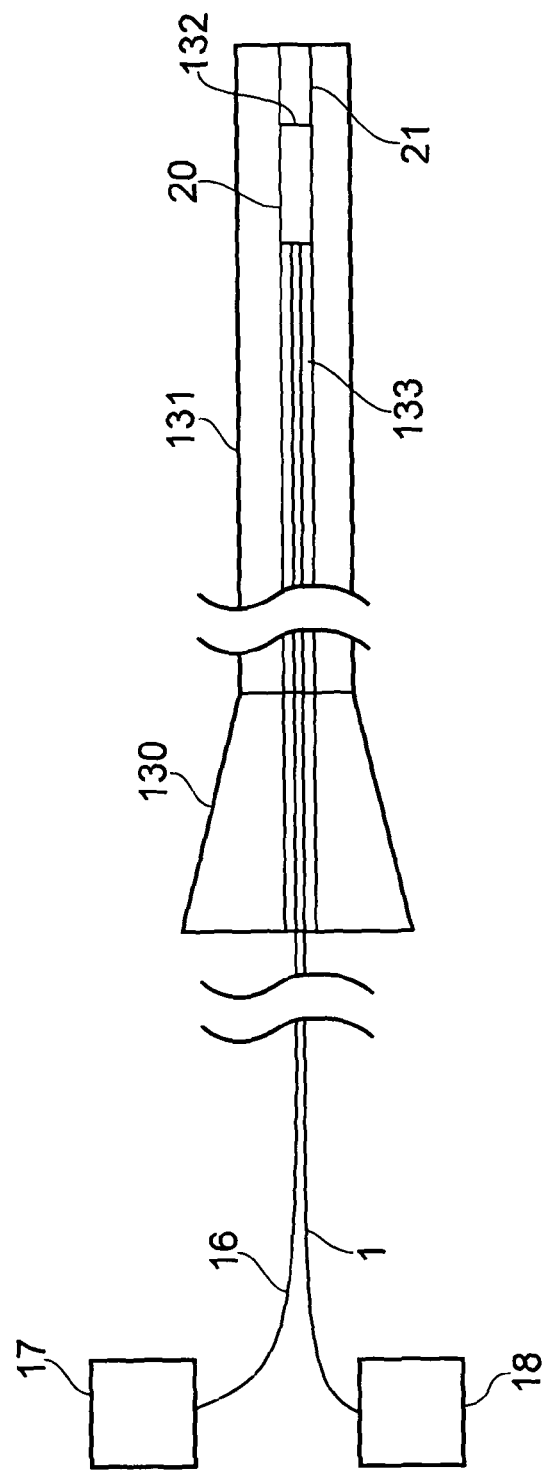
FIG. 25 is a plan view of an endoscope incorporating the spectroscopic probe of FIG. 2.

FIG. 25 is a schematic view of an endoscope incorporating the spectroscopic probe of FIG. 2. The endoscope has a head portion 130 and a shaft portion 131 with an instrument channel which at its distal end contains the sub-assemblies 20, 21 joined together to form a fluid-tight joint 132. The fibres 1, 16 run along the length of the probe portion 132 within a sleeve 133 which fits over the boss 49 in the proximal support piece 22. The shaft portion 131 of the endoscope can be inserted into a body cavity such as the oesophagus in order to obtain a Raman spectrum of the wall of the body cavity.

Although the invention has been described above with reference to one or more preferred embodiments, it will be appreciated that various changes or modifications may be made without departing from the scope of the invention as defined in the appended claims.

The invention claimed is:

1. An optical device comprising a first sub-assembly and a second sub-assembly,
   wherein the first sub-assembly comprises: an input lens for collimating illuminating light, the input lens having an optical axis, an output lens for focusing collimated light received from a sample, the output lens having an optical axis which is offset and substantially parallel with the optical axis of the input lens, and a first support piece which houses and supports the input lens and the output lens, the first support piece comprising:
      a first base which engages the input lens and the output lens, and
      a first cover,
      wherein the first cover and the first base are integrally formed as a single piece, the first cover and the first base together fully enclose the input lens when viewed in cross-section transverse to an optical axis of the input lens, and the first cover and the first base together fully enclose the output lens when viewed in cross-section transverse to an optical axis of the output lens;
   wherein the second sub-assembly comprises:
      an output filter for filtering the collimated light received from the sample, and
      a second support piece which houses and supports the output filter, the second support piece comprising:
         a second base which engages the output filter, and
         a second cover,
         wherein the second cover and the second base are integrally formed as a single piece, and the second cover and the second base together fully enclose the output filter when viewed in cross-section transverse to an optical axis of the output filter; and
   wherein the first and second support pieces are joined together by a joint, and wherein the first and second support pieces each have an outer profile with a substantially circular cross-section, the device further comprising a probe for illuminating and receiving light from a sample, wherein the first and second support pieces each having a maximum outer diameter which is less than 25 mm.

2. The device of claim 1 wherein the second sub-assembly further comprises an input filter for filtering the collimated illuminating light.

3. The device of claim 1 wherein the filter and lenses are housed within a liquid-tight chamber which is at least partially formed by the first and second support pieces.

4. The device of claim 1 further comprising a spectrometer for generating a spectrum from the light received from the sample.

5. The device of claim 1 further comprising an excitation fibre for directing light into the input lens, the excitation fibre having an exit aperture; and an output fibre for receiving light from the output lens, the output fibre having an entrance aperture, wherein the exit aperture of the excitation fibre is confocal with the entrance aperture of the output fibre.

6. The device of claim 1 wherein the joint is a liquid-tight joint.

7. The device of claim 1 wherein the first support piece comprises a closed structure which fully encloses the input lens and the output lens when viewed in cross-section transverse to the optical axes of the input lens and the output lens, and the second support piece comprises a closed structure which fully encloses the output filter when viewed in cross-section transverse to the optical axes of the input lens and the output lens.

8. The device of claim 1 wherein the joint is a plug and socket joint.

9. The device of claim 1 wherein the first support piece comprises a male part which plugs into a socket in the second support piece to form the joint.

\* \* \* \* \*